United States Patent
Hopkins et al.

(10) Patent No.: US 9,823,711 B2
(45) Date of Patent: Nov. 21, 2017

(54) STORAGE SYSTEM AND A STORAGE BRIDGE BAY CANISTER

(75) Inventors: Kenneth M. Hopkins, Chichester (GB); Andrew Goodwin, Havant (GB)

(73) Assignee: Seagate Technology LLC, Cupertino, CA (US)

(*) Notice: Subject to any disclaimer, the term of this patent is extended or adjusted under 35 U.S.C. 154(b) by 726 days.

(21) Appl. No.: 12/895,077

(22) Filed: Sep. 30, 2010

(65) Prior Publication Data

US 2012/0081856 A1 Apr. 5, 2012

(51) Int. Cl.
*G06F 1/16* (2006.01)
*G06F 1/18* (2006.01)

(52) U.S. Cl.
CPC .................................. *G06F 1/187* (2013.01)

(58) Field of Classification Search
CPC ........ G06F 1/187; G06F 12/00; G06F 3/0601; G06F 3/0626; G06F 3/0689; G06F 1/1656; H05K 7/00; H05K 7/14; H05K 7/1487; G11B 33/128; G11B 33/124; G11B 25/043; G11B 33/00
USPC ............. 361/679.32–679.39, 679.01, 679.02
See application file for complete search history.

(56) References Cited

U.S. PATENT DOCUMENTS

| | | | | |
|---|---|---|---|---|
| 5,963,422 | A * | 10/1999 | Golobay et al. | 361/679.57 |
| 6,906,918 | B2 * | 6/2005 | Rabinovitz | 361/679.48 |
| 7,715,182 | B2 * | 5/2010 | Signer et al. | 361/679.33 |
| 7,983,032 | B2 * | 7/2011 | Walker et al. | 361/679.33 |
| 8,250,453 | B2 * | 8/2012 | Matsushige | 714/819 |
| 8,508,928 | B2 * | 8/2013 | Killen et al. | 361/679.33 |
| 2009/0135558 | A1 * | 5/2009 | Hughes | 361/679.46 |
| 2010/0066172 | A1 * | 3/2010 | Lv et al. | 307/64 |
| 2010/0235693 | A1 * | 9/2010 | Kang et al. | 714/718 |
| 2010/0259882 | A1 * | 10/2010 | Song | 361/679.32 |
| 2011/0022792 | A1 * | 1/2011 | Kay | 711/111 |
| 2011/0082971 | A1 * | 4/2011 | Berke | 711/105 |
| 2011/0083992 | A1 * | 4/2011 | Stuhlsatz et al. | 206/706 |

OTHER PUBLICATIONS

Storage Bridge Bay (SSB) Specification, Verson 2.0 [online]. Storage Bridge Bay Working Group, Inc., Jan. 28, 2008 [retrieved on Sep. 30, 2010]. Retrieved from the Internet <URL: http://www.sbbwg.org/home/>.

* cited by examiner

*Primary Examiner* — Jinhee Lee
*Assistant Examiner* — Ingrid Wright
(74) *Attorney, Agent, or Firm* — Holzer Patel Drennan

(57) ABSTRACT

The invention provides a Storage Bridge Bay system, comprising: plural hard disk drives, each arranged within a corresponding slot; one or more Storage Bridge Bay canisters, wherein there is provided in the or each canister one or more solid state drives. In addition in an embodiment, the invention provides a Storage Bridge Bay canister, the canister comprising: electrical connections in accordance with the Storage Bridge Bay standard; and, one or more solid state drives arranged within the canister and arranged in communication with the electrical connections, thereby enabling control of and transfer of data to or from the solid state drives via the electrical connections.

12 Claims, 4 Drawing Sheets

STORAGE SYSTEM AND A STORAGE BRIDGE BAY CANISTER

The present invention relates to a storage system and a Storage Bridge Bay canister.

Typically a storage system includes plural storage media such as hard disk drives arranged to store data. In addition, one or more controllers may be provided arranged, in some way, to be coupled to the storage media and to control the passage of data to and from the storage media. The storage system is defined by an enclosure which includes the storage media and the controller(s) and other associated components. Typically, the controller(s) would be provided within a slot in the enclosure.

Storage Bridge Bay (SBB) is a specification (the entire contents of which are hereby incorporated by reference) that defines mechanical, electrical and low-level enclosure management requirements for an enclosure controller slot that will support a variety of storage controllers from plural independent hardware vendors and storage system vendors. Any storage controller design based on the SBB specification will be able to fit, connect and operate within a storage enclosure controller slot design based on the SBB specification.

As the requirements for data storage increase and the performance requirements of storage systems correspondingly increase, there is a need to increase the data storage capacity of storage systems. One way that this is typically achieved is by increasing the number or capacity of hard disk drives or other such storage media within a storage system. However, there is a limit to the available increase in capacity simply by adding disk drives or increasing the storage capacity of each of the individual disk drives.

According to a first aspect of the present invention, there is provided a Storage Bridge Bay storage system, comprising: plural hard disk drives, each arranged within a corresponding slot; one or more Storage Bridge Bay canisters, wherein there is provided in the or each Storage Bridge Bay canister one or more solid state drives. In other words, within a Storage Bridge bay system, the I/O slot is used for something other than that for which it is primarily designed.

In one example, a storage system is provided in which as well as providing data storage within the disk drives, one or more solid state drives are provided within the Storage Bridge Bay canisters themselves. Thus, as well as providing control functionality as is known according to the Storage Bridge Bay standard, the canister can also provide significant data storage to augment the capacity of the system as a whole. A solid-state drive (SSD) is a data storage device that uses solid-state memory to store data. SSDs are distinguished from hard disk drives (HDDs), which are electromechanical devices containing spinning disks and movable read/write heads. SSDs, in contrast, use microchips, and contain no moving parts. Accordingly, compared to traditional HDDs, SSDs are typically less susceptible to physical shock, are quieter, and have lower access time and latency.

In addition, by use of the SBB canister to house storage devices, the data pathways defined by the Storage Bridge Bay specification may be used to read and/or write data to and from the solid state drives within the Storage Bridge Bay canisters. Thus, a simple and convenient system is provided by which the storage capacity of a storage system can be increased whilst making use of existing data pathways defined by the Storage Bridge Bay specification.

In one example, the storage provided within the canister is in the form of one or more standard hard disk drives with rotating media. Thus, significant additional storage capacity is provided to the SBB system, which augments the system's capabilities and functions. Instead of simply providing storage in the disk drive bays within the SBB system, significant storage is also provided in the canisters too. This is counterintuitive since the canisters are conventionally thought of as providing the control functions to the SBB system in contrast to the storage which is provided by the HDDs.

According to a second aspect of the present invention, there is provided a Storage Bridge Bay canister, the canister comprising: electrical connections in accordance with the Storage Bridge Bay standard; and, one or more solid state drives arranged within the canister and arranged in communication with the electrical connections, thereby enabling control of and transfer of data to or from the solid state drives via the electrical connections.

A Storage Bridge Bay canister is provided that utilises existing electrical connections in accordance with the Storage Bridge Bay standard to enable data to be read or written to or from a solid state drive provided within the canister. In contrast to conventional Storage Bridge Bay canisters which are used solely for control purposes the present canister is provided with solid state drives that can be used to increase the overall storage capacity of a system without requiring significant hardware modifications since existing data pathways according to the Storage Bridge Bay standard can be used.

In one embodiment, the one or more solid state drives are provided within a cassette for arrangement within the canister. The use of a cassette containing plural solid state drives means that plural such drives can easily and effectively be connected within a Storage Bridge Bay canister without having to handle or manipulate an individual drive at the point of insertion. Thus, a simple and robust means is provided by which the solid state drives can be connected to a Storage Bridge Bay canister.

Preferably, the canister further comprises a connector for engagement with a corresponding connector on the cassette. Thus, a simple plug and connect system can be provided so that the plural solid state drives can be connected to the Storage Bridge Bay canister with a simple process.

It is preferred that the cassette is arranged to house two or more solid state drives. Preferably the number of drives included within the cassette is selected in dependence on the storage requirements of the canister.

In one embodiment, the canister is provided with slots in one or more walls thereof, to enable insertion and/or removal of a solid state drive from the canister. Preferably, the slots are provided in a side wall of the canister. This enables easy and convenient access to the slots for a user when a canister is removed from the storage enclosure without the need to open the canister in any way.

In one embodiment, the canister is provided with a midplane arranged to receive the one or more solid state drives.

Preferably, the canister is provided with a movable rear panel, selectively reconfigurable between an open position in which the solid state drive can be inserted and connected to the mid plane and a closed position in which the canister is closed. Thus with the rear panel in an open position the one or more solid state drives can be easily plugged into or removed from the canister without "disturbing" any other of the solid state drives within the canister. Furthermore, the panel can be opened with the canister remaining in the enclosure so that hot removal of a solid state drive is enabled.

In one embodiment, the canister is provided with a base board having one or more slots for receiving the solid state drives. Preferably, the slots are sized and configured to receive the solid state drives having a form factor such as that of a DIMM module.

According to a third aspect of the present invention, there is provided a storage system comprising: a housing having a front section and a rear section; the front section having slots for receiving plural hard disk drives; the rear section having slots for receiving one or more Storage Bridge Bay canister; and, one or more storage bay canisters according to the second aspect of the present invention.

According to a fourth aspect of the present invention, there is provided A Storage Bridge Bay storage system, comprising: plural hard disk drives, each arranged within a corresponding slot and providing storage; one or more Storage Bridge Bay canisters, wherein there is provided in the or each canister one or more solid state drives providing storage such that the storage capacity of the Storage Bridge Bay storage system is defined by the combination of the plural hard disk drives and the one or more solid state drives provided in the one or more Storage Bridge Bay canisters.

A storage system is provided in which an SBB canister, e.g. an I/O slot, is converted into an additional storage slot. A new and inventive use for an I/O slot is provided.

Preferably, the total capacity of the one or more solid state drives is at least 1 GB. In embodiments, the capacity of the solid state drives within the canister can be at a value required by an application or system. For example, it could be at least 10 GB. In one embodiment, it is greater than or equal to 1 TB.

Embodiments of the present invention will now be described in detail with reference to the accompanying drawings, in which.

Figure 1A:
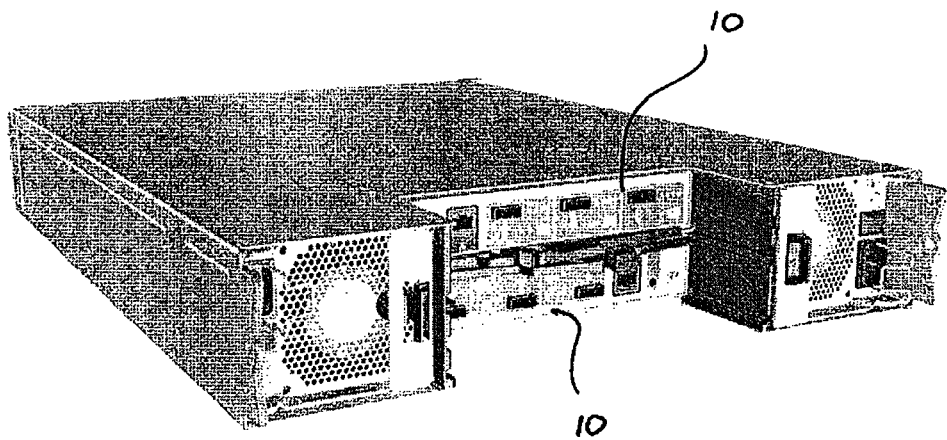
FIGS. 1A and 1B are schematic representations of a storage system.
Figure 1B:
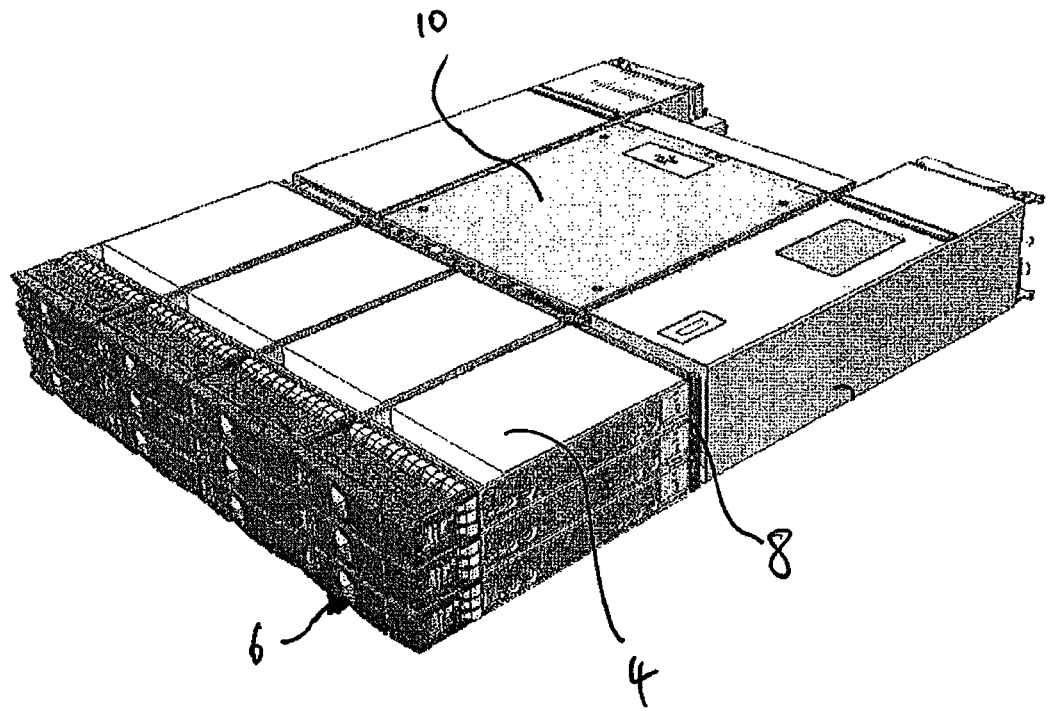

FIGS. 1A and 1B are a schematic representation of different views of a storage system. The storage system 2 comprises plural disk drives 4 each provided in a corresponding disk drive bay 6. A midplane 8 is provided and two Storage Bridge Bay canisters 10 are provided to provide power and cooling to the system.

Figure 2:
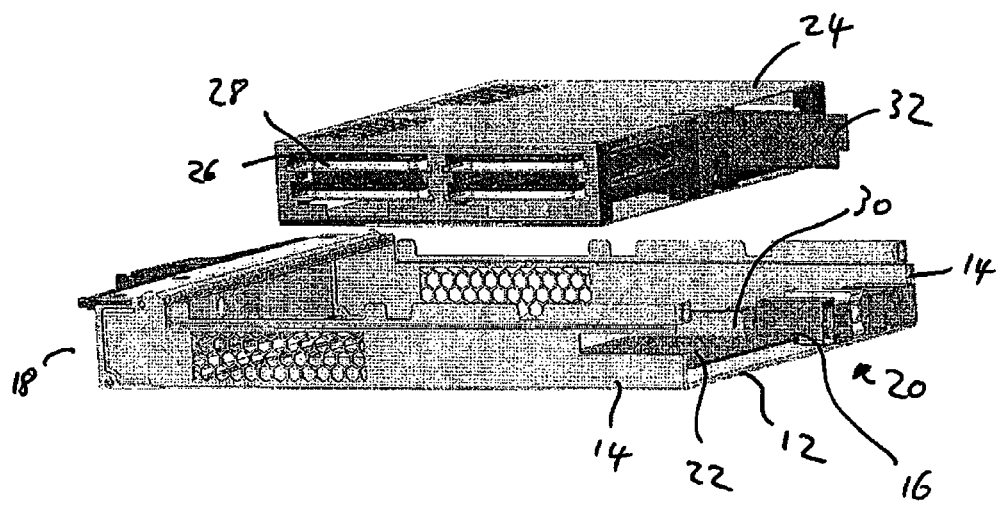
FIG. 2 is a schematic representation of a Storage Bridge Bay canister.

FIG. 2 is a schematic representation of a Storage Bridge Bay canister. In this example, the canister has a bottom wall 12, side walls 14 and front and rear walls, 16 and 18 respectively. Connector housings 20 are provided which provide data pathways to the canister and also power and control connections. The electrical connections are defined by the Storage Bridge Bay specification, the entire contents of which are hereby incorporated by reference, as produced by the Storage Bridge Bay Working Group. The complete specification (v2.0) can be downloaded from http://www.sbbwg.org/home. A control board 22 is provided in the canister. In addition, storage in the form of solid state drives is provided.

In this particular example, a cassette 24 is provided arranged for engagement with and connection to the canister. The cassette 24 has slots 26 into which solid state drives 28 can be inserted. The cassette 24 is sized so as to fit comfortably within the footprint of the canister. Thus, the canister is able to provide its normal control functions and, in addition, significant storage capacity in the form of the solid state drives. Typically the storage provided in the SBB canister may be from 5% up to 50% (or in some cases even more) of the capacity of the rotating media or hard disk drives provided within the SBB system. Preferably, the storage provided in the SBB canister is at least 20% (more preferably at least 30% or at least 40%) of the capacity of the rotating media or hard disk drives provided within the SBB system. The solid state drives can provide data at high speed and so in some applications can be used as cache memory within the canister so as to reduce the need for frequent access to data stored on the disk drives 4 within the storage system. The capacity of the storage provided by the solid state drives is of the order of gigabytes and/or terabytes.

Within an SBB canister, as defined by the SBB standard, there are a number of physical links, any or all of which may be utilised in the present system. The SBB standard defines some of these physicals links for drives and other management functions and others are optional connections. In the present system, preferably a multiplexor (not shown) is incorporated into the canister which allows for some flexibility in how the interconnects are routed. In other words, in effect the interconnects are selectively reconfigurable by use of the multiplexor such that they are programmable. In one particularly preferred embodiment, the system is completely configurable and able to operate from any of the defined SBB connector positions.

The optional connections specified in the SBB standard are defined in two groups or "Modules". Module M1 typically contains 8 high speed differential pairs that are used for inter-canister communications. Module M5 contains 9 high speed differential pairs that can be used for a number of purposes. In the present system, either or both of the modules can be used as required, e.g. to write data to or read data from the storage on the solid state drives.

It is preferred that multiple solid state drive devices would be provided within the canister. Any appropriate number can be provided and the precise number will depend on the specific application and storage requirements. In the example shown in FIG. 2, the use of the cassette is particularly convenient. This means that there can be a single connector provided between the solid state drives and the canister itself, instead of plural connectors for each of the individual solid state drives. In the example of FIG. 2, a connector slot 30 is provided on the base board 22. In addition, a connector card 32 is provided, exposed from the cassette and sized and configured for engagement with the slot 30. Any convenient format can be used for the connectors 30 and 32. It will be appreciated in general that having such a connection between the storage cassette 24 and the board 22 enables convenient means by which these solid state drives can be provided in or removed from the canister.

Figure 3:
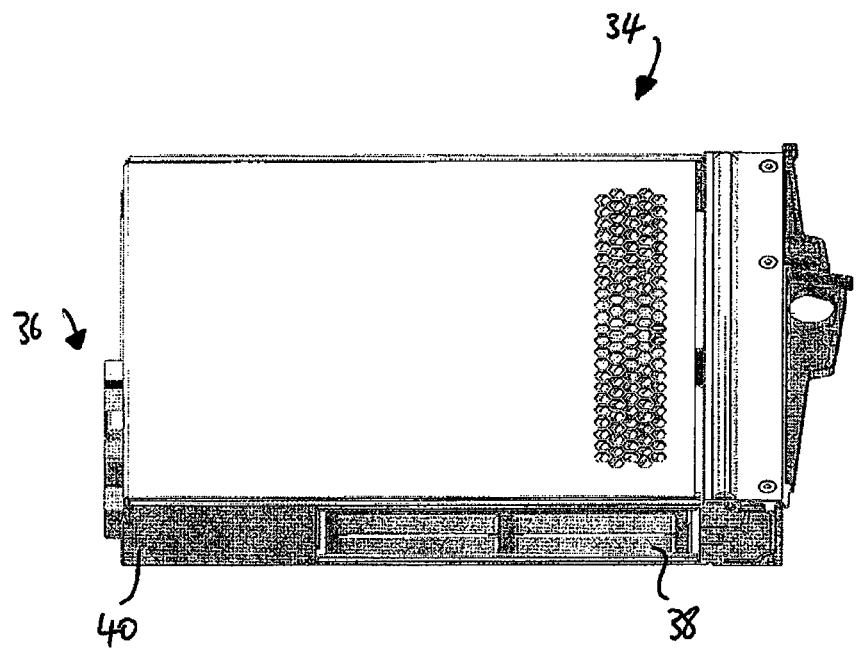
FIG. 3 is a schematic representation of a Storage Bridge Bay canister.

FIG. 3 is a schematic representation of a Storage Bridge Bay canister 34. Again, the standard electrical connectors 36 as defined by the SBB specification are provided on the rear wall of the canister 34. In this example, slots 38 are provided within the side wall 40 of the canister 34. Thus, solid state drives can be inserted into the canister through the slots as required. Again, the connectors 36 provide for data and control pathways to and from the solid state devices.

Figure 4:
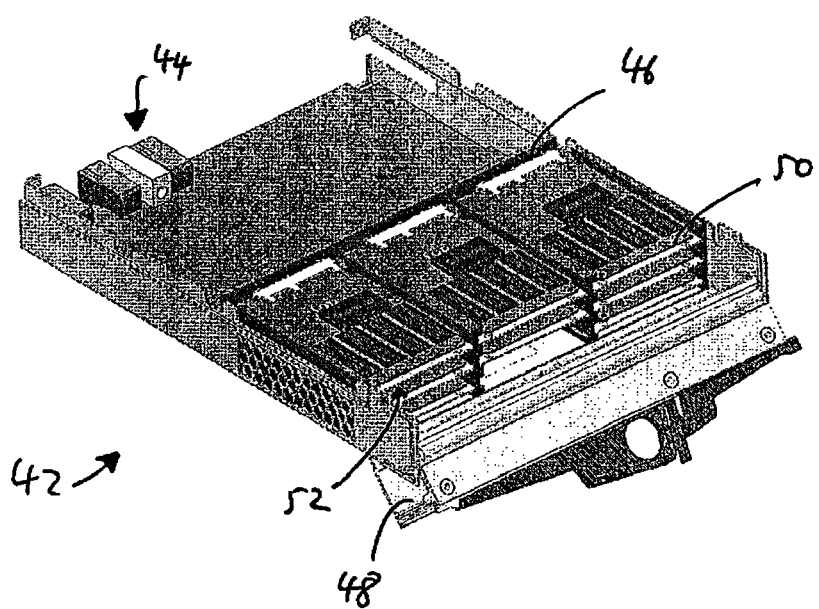
FIG. 4 is a schematic representation of a Storage Bridge Bay canister.

FIG. 4 is a schematic representation of an alternative embodiment. In this case, the canister 42 again has the standard connectors 44 as defined by the Storage Bridge Bay specification. In this case, an internal midplane 46 is provided within the canister 42. In addition, in this example, a movable rear panel is provided 48. The rear panel is movable, e.g. in a pivoted manner with respect to the canister body, between an open position (as shown) in which solid state drives 50 can be inserted into or removed from the canister and a closed position. In the open position, the solid state drives 50 can be inserted into slots 52 and engaged with corresponding connectors on the midplane 46. This is, of course, analogous to current methods for loading disk drives or canisters into a conventional storage system. The presence of a movable rear panel on the canister 42 enables part insertion/removal of solid state drives. In other words, a drive can be removed without removing the canister as a whole or without unplugging the entire canister and powering it down. This is particularly advantageous.

It will be appreciated that it need not be the rear wall of the canister that is provided with a moveable panel and the panel need not constitute the whole of the wall. In other words a simple flap can be provided in any of the walls of the canister so as to enable insertion or removal of a solid state drive thereto or therefrom.

Figure 5:
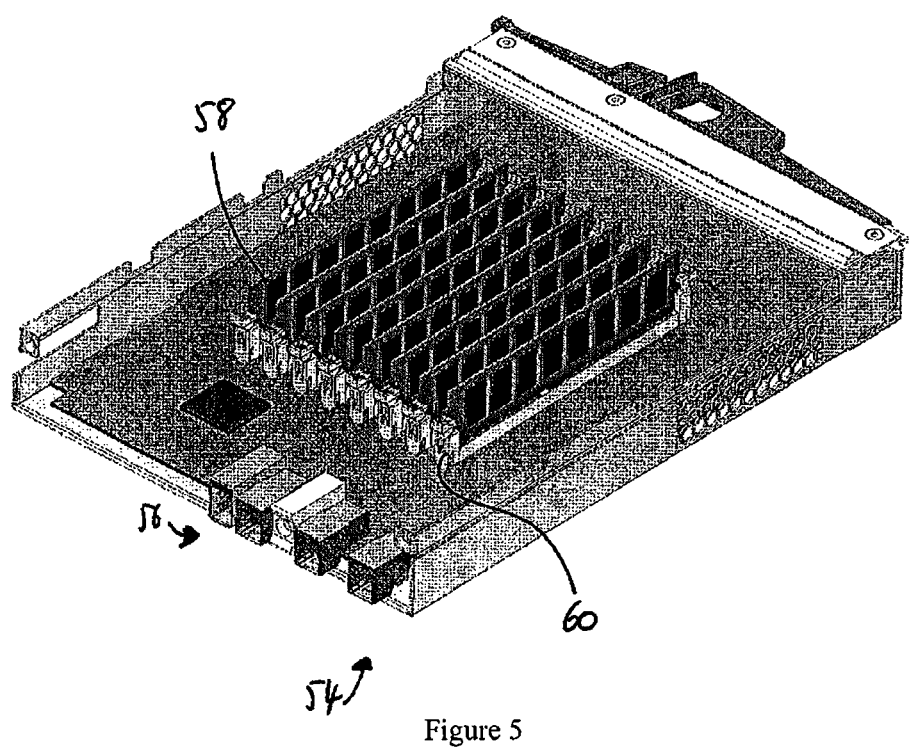
FIG. 5 is a schematic representation of a Storage Bridge Bay canister.

FIG. 5 is a schematic representation of an alternative embodiment. In this example, the canister 54, again is provided with the SBB connectors 56. Solid state drives 58 are provided, arranged within connectors 60 in the form of suitably sized and configured slots. The solid state drives are arranged on a base board using a form factor such as DIMM modules or some other suitable board-to-board connector. Thus, a simple and convenient method and apparatus is provided by which solid state drives can be arranged within a Storage Bridge Bay canister.

In general, there is provided a means by which the storage of a storage system can be increased by providing additional storage within a Storage Bridge Bay canister usually used for control functions.

Embodiments of the present invention have been described with particular reference to the examples illustrated. However, it will be appreciated that variations and modifications may be made to the examples described within the scope of the present invention.

The invention claimed is:

1. A Storage Bridge Bay storage system, comprising:
   a housing comprising:
      a front section comprising hard disk drive slots configured to receive a plurality of hard disk drives; and
      a rear section comprising one or more Storage Bridge Bay canister slots, each slot configured to receive a Storage Bridge Bay canister;
      wherein the front section and the rear section are separated by a mid-plane; and,
   a Storage Bridge Bay canister configured to be received in the rear section, the Storage Bridge Bay canister comprising:
      one or more solid state drives having, in total, storage capacity greater than or equal to a gigabyte; and,
      electrical connections in accordance with the Storage Bridge Bay standard;
      wherein the electrical connections are in communication with the one or more solid state drives thereby enabling control and transfer of data to or from the one or more solid state drives;
   wherein a storage capacity of the Storage Bridge Bay storage system is defined by a combination of a storage capacity of the plurality of hard disk drives received in the front section and a storage capacity of the one or more solid state drives provided in the one or more Storage Bridge Bay canisters received in the rear section.

2. A Storage Bridge Bay canister of a storage bridge bay storage system arranged to be received in a Storage Bridge Bay canister slot of a rear section of a Storage Bridge Bay housing, wherein the Storage Bridge Bay housing comprises hard disk drive slots in a front section configured to receive a plurality of hard disk drives; and the front and rear sections being separated by a mid-plane, the Storage Bridge Bay canister comprising:
   electrical connections in accordance with Storage Bridge Bay standard; and,
   one or more solid state drives having, in total, storage capacity greater than or equal to a gigabyte, the one or more solid state drives being arranged within the Storage Bridge Bay canister and arranged in communication with the electrical connections, thereby enabling control of and transfer of data to or from the one or more solid state drives via the electrical connections;
   wherein a storage capacity of the Storage Bridge Bay storage system is defined by a combination of a storage capacity of the plurality of hard disk drives received in the front section and a storage capacity of the one or more solid state drives provided in the one or more Storage Bridge Bay canisters received in the rear section.

3. A canister according to claim 2, wherein the one or more solid state drives are provided within a cassette for arrangement within the canister.

4. A canister according to claim 3, wherein the canister further comprises a connector for engagement with a corresponding connector on the cassette.

5. A canister according to claim 3, wherein the cassette is configured to house two or more solid state chives.

6. A canister according to claim 2, wherein the canister has slots in one or more walls thereof, to enable insertion or removal, or both of a solid state drive from the canister.

7. A canister according to claim 6, wherein the slots are provided in a side wall of the canister.

8. A canister according to claim 2, wherein the canister is provided with a mid-plane arranged to receive the one or more solid state drives.

9. A canister according to claim 8, wherein the canister is provided with a movable rear panel, reconfigurable between an open position in which a solid state drive can be inserted and connected to the mid-plane and a closed position in which the canister is closed.

10. A canister according to claim 2, further comprising a base board having one or more slots for receiving the one or more solid state drives.

11. A canister according to claim 10, wherein the slots are sized and configured to receive one or more solid state drives having a form factor such as that of a DIMM module.

12. A Storage Bridge Bay storage system, comprising:
   a housing comprising:
      a front section comprising hard disk drive slots for receiving a plurality of hard disk drives; and,
      a rear section comprising one or more Storage Bridge Bay canister slots, each slot configured to receive a Storage Bridge Bay canister;
      wherein the front section and the rear section are separated by a mid-plane;
   a plurality of hard disk drives, each hard disk drive being arranged within a corresponding hard disk drive slot in the front section of the housing, and providing storage; and
   one or more Storage Bridge Bay canisters arranged to be received in a Storage Bridge Bay canister slot in the rear section of the housing, wherein each of the one or more Storage Bridge Bay canisters comprises:

a control board;
one or more solid state drives providing a storage capacity of at least 1 gigabyte; and
connector housings comprising data pathway, power and control electrical connections in accordance with Storage Bridge Bay standard in communication with the one or more solid state drives thereby enabling control and transfer of data to or from the one or more solid state drives;
wherein a storage capacity of the Storage Bridge Bay storage system is defined by a combination of a storage capacity of the plural hard disk drives received in the front section and a storage capacity of the one or more solid state drives provided in the one or more Storage Bridge Bay canisters received in the rear section.

\* \* \* \* \*